United States Patent [19]

Buchtel et al.

[11] E Patent Number: Re. 33,228

[45] Reissued Date of Patent: Jun. 5, 1990

[54] OPTICAL SCANNING APPARATUS INCORPORATING COUNTER-ROTATION OF ELEMENTS ABOUT A COMMON AXIS BY A COMMON DRIVING SOURCE

[75] Inventors: Michael E. Buchtel, Costa Mesa; Ronald T. Honda, Irvine, both of Calif.

[73] Assignee: Ford Aerospace Corporation, Detroit, Mich.

[21] Appl. No.: 376,100

[22] Filed: Jul. 6, 1989

Related U.S. Patent Documents

Reissue of:

[64] Patent No.: 4,427,878
Issued: Jan. 24, 1984
Appl. No.: 319,010
Filed: Nov. 6, 1981

[51] Int. Cl.[5] ..... G01J 1/20

[52] U.S. Cl. ..... 250/203.6; 250/236; 350/6.9

[58] Field of Search ..... 250/203 R, 234, 235, 250/236, 216, 338, 347, 353; 350/6.9, 6.91; 244/3.16

[56] References Cited

U.S. PATENT DOCUMENTS

| | | | |
|---|---|---|---|
| 2,967,246 | 1/1961 | Ostergren | 250/203 |
| 2,975,668 | 3/1961 | Eckel | 88/1 |
| 3,083,611 | 4/1963 | Ziolkowski et al. | 88/1 |
| 3,136,895 | 6/1964 | Whitney | 250/236 |
| 3,226,721 | 12/1965 | Gould | 343/754 |
| 3,330,958 | 7/1967 | Kaisler et al. | 250/203 |
| 3,378,687 | 4/1968 | Schepler | 250/203 |
| 3,453,442 | 7/1969 | Spangenberg | 250/236 |
| 3,653,737 | 4/1972 | Stripling et al. | 250/203 |
| 3,752,998 | 8/1973 | Stripling et al. | 250/203 |
| 3,872,308 | 3/1975 | Hopson et al. | 250/347 |
| 4,009,393 | 2/1977 | Ashley, Jr. et al. | 250/339 |
| 4,010,365 | 3/1977 | Meyers et al. | 250/236 |
| 4,030,807 | 6/1977 | Briney | 350/7 |
| 4,039,246 | 8/1977 | Voigt | 350/7 |
| 4,061,415 | 12/1977 | Taenzer | 350/6 |
| 4,070,573 | 1/1978 | Allen et al. | 250/347 |
| 4,123,134 | 10/1978 | Meyers | 350/6.7 |
| 4,329,579 | 5/1982 | Jansen et al. | 250/203 |

FOREIGN PATENT DOCUMENTS 565988 8/1975 Switzerland .

OTHER PUBLICATIONS

Ideas in Motion Bulletin No. 1-401, Miniature Precision Bearings, 1969.

*Primary Examiner*—David C. Nelms
*Attorney, Agent, or Firm*—Sughrue, Mion, Zinn, Macpeak & Seas

[57] ABSTRACT

An optical scanning apparatus embodied in a gyroscopic missile seeker to provide a rosette scan pattern of the field of view. A single driving motor is employed with a traction drive assembly to produce the necessary counter-rotation of scanned elements and thereby effect the rosette scan pattern.

10 Claims, 2 Drawing Sheets

OPTICAL SCANNING APPARATUS INCORPORATING COUNTER-ROTATION OF ELEMENTS ABOUT A COMMON AXIS BY A COMMON DRIVING SOURCE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention is directed to the field of optical scanning and more specifically to the area of gyroscopically mounted missile seeker assemblies and other optical telescope applications.

2. Description of the Prior Art

In the last several years, it has been found that the most efficient data collection pattern for scanning a field of view with a gyro-stabilized target seeker in a missile is the "rosette" scan pattern. The "rosette" scan pattern and prior art assemblies are discussed in U.S. Pat. Nos. 4,009,393; 4,030,807; and 4,039,246, the texts of which are incorporated herein by reference. In each of the aforementioned patents, the "rosette" scan pattern is achieved in a cassegrain type telescope configuration by effecting counter-rotation of two separate, slightly canted, scanning elements and effecting counter-rotation by employing a separate rotational drive motor for each scanning element.

Although the prior art attempts described above appear to give a sound theoretical approach to achieving the "rosette" scan pattern, the actual construction of such devices has been found to present critical imbalance problems and phase instability. Other problems occur in attempting to incorporate the number of drive motors specified in the prior art patents into the severely limited space provided in missile environments.

SUMMARY OF THE INVENTION

The present invention is intended to overcome the problems of the prior art by providing an optical scanning apparatus which achieves a "rosette" scan pattern of images over the field of view and by utilizing a single driving means to achieve counter-rotation of a plurality of scan elements within the apparatus.

An embodiment of the invention is shown installed on a gyro-stabilized target seeker of the type commonly employed in missile applications. The gyro-optics assembly of the present invention consists of a gimbal mounted cassegrain telescope with an aspheric primary mirror and tilted secondary mirror which produces a primary conical scan of the field of view, as defined by primary mirror, that is relayed to a focal plane near the center of the gyro. The telescope also includes a secondary scanning mechanism, containing an optical relay assembly, that produces a second conical scan of the image over the field of view in a rotational direction that is opposite to that of the tilted secondary mirror rotation. The vector sum, of the two scans acting in concert, produces the "rosette" scan pattern of the field of view and the scanned images are focused onto a detector located at the focal plane.

The secondary scanning mechanism is mechanically linked to the primary scanning portion of the gyro-optical system through a traction drive assembly. The traction drive assembly is composed of a planetary bearing system which includes a spin bearing and a traction gear drive of the secondary scan mechanism.

The primary and secondary mirrors are caused to rotate about the gyroscopic spin axis by a relatively fixed motor means in the form of drive coils energized to interact with a magnetic gyro mass. The magnetic gyro mass is formed to also function as a support for the primary mirror surface and is structurally connected to the secondary mirror. The rotation of the primary and secondary mirrors is directly communicated through the traction drive mechanism to the secondary scan mechanism to thereby synchronously rotate the secondary scan mechanism at a speed which is continuously proportional to the speed and opposite to the direction of the primary and secondary mirror rotation.

It is, therefore, an object of the present invention to provide an optical scan apparatus which achieves the desired "rosette" scan pattern of a field of view through counter-rotation of separate scan elements with a common driving source.

It is another object of the present invention to provide a scanning apparatus in which the secondary scan mechanism is mechanically linked to the primary scan mechanism to assure absolute phase synchronization.

It is another object of the present invention to provide an optical scanning apparatus in which moving parts of the scanner are near the focal plane and gyroscopic center of the gyro-optic assembly, therefore allowing the use of smaller optics and drive components and thereby reducing the angular momentum of the scan to a point where it has minimal effect on the stability of the gyro.

DETAILED DESCRIPTION OF THE EMBODIMENT

Figure 1:
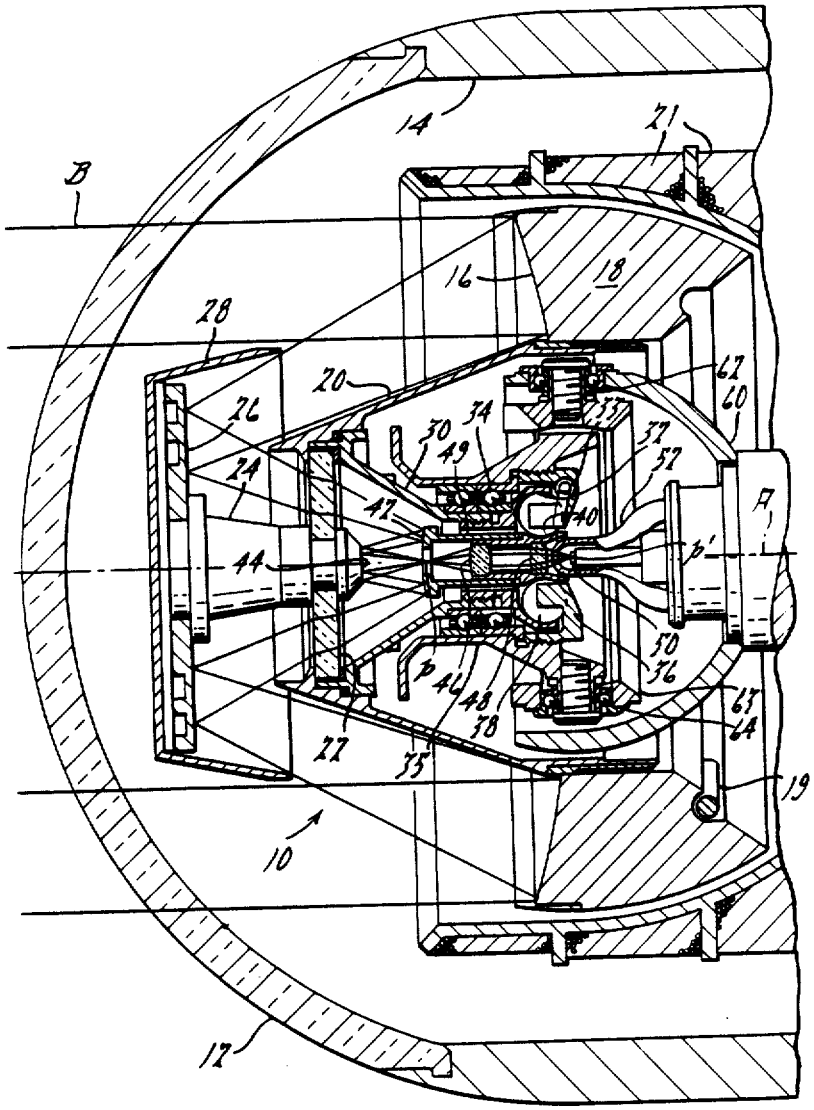
FIG. 1 is a 90° cross-sectional view of an optical seeker employing the present invention.

The present invention is shown in FIG. 1 as being within a gimbal mounted cassegrain type telescope 10 within a missile housing 14 behind a transparent dome 12. Electromagnetic energy within the field of view, as defined by a concave primary mirror 16, is transmitted through the dome 12 and then reflected and converged forward to a secondary mirror 26 towards the spin axis "A." The energy reflected by the mirror 26 is directed through a support lens 22 to a focal point p where it is conveyed by an optical relay assembly which focuses the image onto a detector 50 located at the gyroscopic center point p′ of the assembly.

The concave primary mirror 16 is formed on the forward looking surface of a permanent magnet gyro mass 18 that is mounted for gyroscopic rotation about the spin axis A, which is shown in FIG. 1 as being approximately coincident with the optical axis. Drive coils 21 are fixedly located so as to enclose the gyroscopic mass 18 and are energized to generate the required magnetic flux that in turn causes the gyro mass 18 to be rotated. A groove is located in the rearward portion of the gyro mass 18 in order to provide a location for the insertion of stabilizing balancing weights 19.

The gyro mass 18 and the primary mirror 16 are mounted on a support housing 20 that is fixedly connected to a rotary support 30. The support lens 22 has its outer edges connected to the rotary support 30 and provides support for the secondary mirror 26. A central aperture in support lens 22 receives a pedestal 24; and the opposite end of the pedestal 24 is connected to a base/shroud 28. The circular secondary mirror 26 is mounted in the base/shroud 28. Although it is difficult to discern from the drawings, the secondary mirror 26 is slightly canted (approximately 1°) with respect to the spin axis A. The common rotation of the primary mirror 16 and the secondary mirror 26 about the spin axis A therefore creates a primary conical scan of images, over the field of view defined by the primary mirror 16.

The rotary support 30 is mounted for rotational movement about the spin axis A by spin bearings 34, with reference to an inner gimbal ring 35. The inner gimbal ring 35 is gimbal supported by a first pair of gimbal pivots 64 (only one is shown) which interconnect the inner gimbal ring 35 to an outer gimbal ring 63. The outer gimbal ring 63 is in turn gimbal supported through a second pair of gimbal pivots 62 (only one is shown) to a relatively fixed support housing 60.

The relatively fixed support housing 60 is attached to the body of the missile 14 through various elements that are not shown. A Dewar flask 52 is provided with a transparent portion for receiving the focused image from relay lens 48 and for providing a cryogenic atmosphere to the detector 50 at the gyroscopic center point p'. The detector 50 provides an output signal to an electronic amplifier (not shown), to indicate the amount of energy instantaneously received throughout the scan pattern.

The secondary scan portion of the apparatus is provided by an optical relay mechanism hereinafter described. An apertured secondary scan mirror 42 is located to intercept the energy reflected from secondary mirror 26 and through support lens 22. The reflective surface of the secondary scan mirror 42 is convex and slightly canted (approximately 3°) with respect to the axis A; and is mounted for rotation about the spin axis A. The secondary scan mirror 42 interacts with a planar relay mirror 44 that is oppositely disposed on the end of pedestal 24 to refold the reflected beam to focus at a focal point p within the aperture of the secondary scan mirror 42. Relay lenses 46 and 48 are located within a lens tube 49. Lens tube 49 also provides support for the secondary scan mirror 42.

Figure 3:
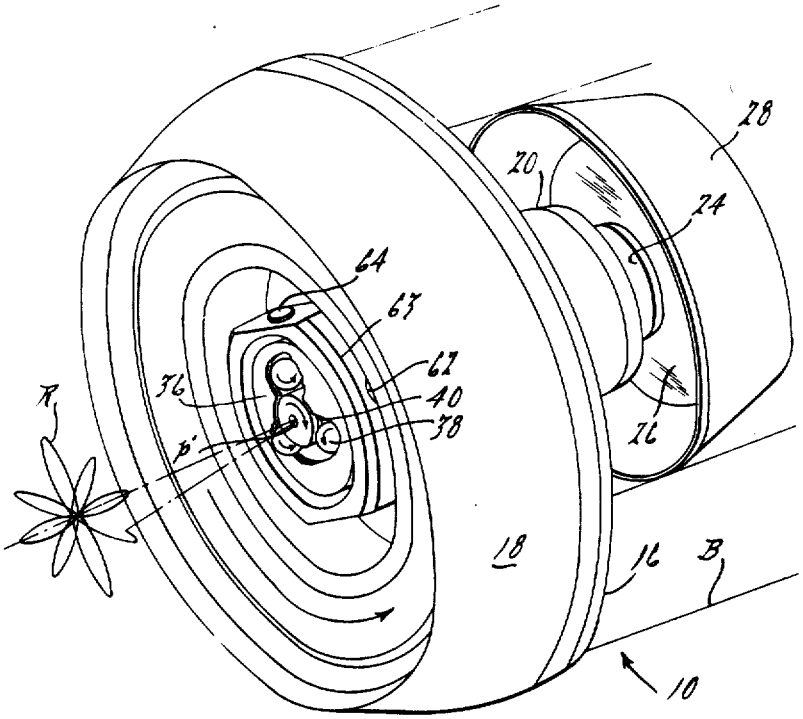
FIG. 3 is a perspective view of the cassegrain telescope employing the present invention.
Figure 2:
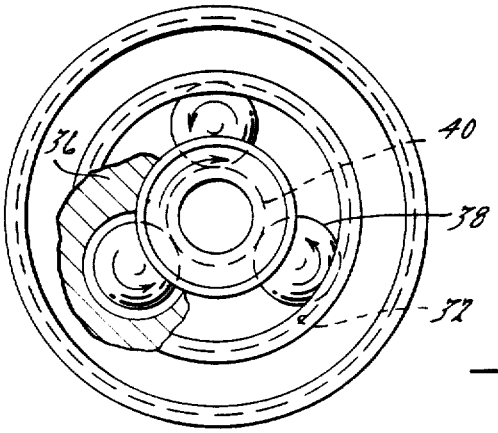
FIG. 2 is a schematic illustration of the traction drive assembly, as employed in the present invention.

Counter-rotation of the secondary scan mirror 42 and relay lenses 46 and 48, with respect to the rotational direction of the primary and secondary mirrors, is achieved through a traction drive assembly which is further detailed in FIGS. 2 and 3.

The traction drive assembly includes three balls 38 which function as planetary gears held in a relatively fixed spacial relationship by a cage 36 and disposed about an inner race sun gear 40 formed on the outer surface of lens tube 49. The inner surface 32 of the rotary support 30 forms the outer race ring gear of the traction drive system.

In operation, when power is applied to the drive coils 20 to cause spinning of the gyro-mass 18 as well as the respective primary and secondary mirrors 16 and 26, the outer race 32 contacts the outer surfaces of the balls 38 causing them to rotate in place, due to the retaining cage 36. The rotating balls 38 cause counter-rotation of the lens tube 49 at a rate that is proportional to the *inverse of the ratio of the* radial dimension of the inner race 40 contact point to that of the outer race 32 contact point with the balls 38. In the present embodiment, the rotational ratio of the secondary scan mirror 42 to that of the primary scan offered by secondary mirror 26 is approximately 2.714:1. In that manner, a rosette pattern R of focused images is scanned over the field of view and each image is sequentially swept over the detector 50 in a continuous fashion.

Of course, it is expected that many modifications and variations will be apparent to those skilled in the art. For instance, since the present invention is shown in an embodiment for receiving energy from a remote source, the invention is envisioned as also being well suited for scanning devices which project energy towards a distant target from a source imaged at the point p or p'. Accordingly, it is intended by the appended claims to cover all such modifications and variations which fall within the true spirit and scope of the invention.

We claim:

1. An optical scanning apparatus including:
   - means providing a concave primary mirror disposed to focus an image within the field of view of said primary mirror at a central optical axis;
   - detector means disposed on said optical axis for receiving said focused image and responsively outputting an electrical signal;
   - means providing a secondary mirror interconnected with and displaced from said primary mirror on said optical axis to direct said focused image towards said detector means;
   - means for rotating said primary and secondary mirror providing means at a first rate and direction about said optical axis;
   - means intermediate said secondary mirror and said detector means for optically relaying said directed focused image to said detector means; and
   - means connected to said providing means for responsively rotating said optical relaying means about said optical axis at a rate that is directly proportional to said first rate and in a direction that is opposite to the rotation of said rotational direction of said primary and secondary mirror providing means.

2. A scanning apparatus as in claim 1, wherein said secondary mirror contains a flat non-focusing reflective surface that is slightly canted with respect to the optical axis and provides a primary conical scan of images to said detector means.

3. An optical scanning apparatus as in claim 2 wherein said primary and secondary mirror providing means, said optical relay means and said optical relay rotating means are gimbal mounted to move about a central point at which said detector means is located and maintain the focus of said image at said detector means.

4. An apparatus as in claim 3, wherein said optical relay rotating means includes a traction drive mechanism to communicate counter-rotational forces from said rotating primary and second mirror providing means to said optical relay means so as to rotate said optical relay means in a direction opposite to the rotational direction of said primary and secondary mirrors.

5. An apparatus as in claim 4, wherein said rotating optical relay means effects a rosette scan pattern of images over said field of view onto said detector.

6. An apparatus as in claim 5, *further including a flat secondary relay mirror on said optical axis*, wherein said optical relay means includes an apertured relay mirror, [a flat secondary relay mirror] and a set of relay lenses mounted on said optical axis, wherein said apertured relay mirror reflects said image from said secondary mirror means to said flat secondary relay mirror where it is focused at a point preceding said relay lenses; said relay lenses function to convey the image at said point to said detector means.

7. An apparatus as in claim 6, wherein said aperture relayed mirror is slightly canted with respect to said optical axis and is rotated by said optical relay rotating means at said proportional rate in a direction that is opposite to the rotational direction of said primary and second mirrors to effect a secondary conical scan of images in concert with said primary conical scan to produce a rosette scan pattern of images over said defined field of view.

8. An optical scanning apparatus for providing a rosette scan pattern of focused images over the field of view of said apparatus, including:

a focused primary mirror for defining said field of view;

a secondary mirror means in the optical path established by said primary mirror for conically scanning said defined field of view at a first rate and direction of rotation;

optical relay means in said optical path adjacent said secondary mirror means for conically scanning said defined field of view at a second rate of rotation that is directly proportional to said first rate and in a rotational direction opposite to said first direction of rotation; and a single motor means for producing the rotation of said secondary means and the counter-rotation of said relay means.

9. An optical scanning apparatus as in claim 8, wherein said primary mirror means, secondary mirror means and optical relay means are gimbal mounted.

10. An optical scanning apparatus as in claim 9, wherein said motor means functions to rotate said primary mirror means and said secondary mirror means at said first rate and includes a traction drive means between said secondary mirror means and said optical relay means to responsively rotate said optical relay means in said opposite direction.

* * * * *